(12) United States Patent
Taubman

(10) Patent No.: US 8,705,621 B2
(45) Date of Patent: Apr. 22, 2014

(54) METHOD AND APPARATUS FOR SCALABLE COMPRESSION OF VIDEO

(75) Inventor: David Taubman, Eastwood (AU)

(73) Assignee: Unisearch Limited (AU)

( * ) Notice: Subject to any disclaimer, the term of this patent is extended or adjusted under 35 U.S.C. 154(b) by 370 days.

(21) Appl. No.: 13/026,560

(22) Filed: Feb. 14, 2011

(65) Prior Publication Data

US 2012/0042048 A1 Feb. 16, 2012

Related U.S. Application Data

(63) Continuation of application No. 10/170,465, filed on Jun. 14, 2002, now Pat. No. 7,889,791, which is a continuation-in-part of application No. PCT/AU01/01660, filed on Dec. 21, 2001.

(51) Int. Cl.
*H04N 7/12* (2006.01)
*H04N 11/02* (2006.01)
*H04N 11/04* (2006.01)
*H04B 1/66* (2006.01)
*H04N 7/26* (2006.01)

(52) U.S. Cl.
CPC ............................... *H04N 19/00442* (2013.01)
USPC .................................................... 375/240.11

(58) Field of Classification Search
None
See application file for complete search history.

(56) References Cited

U.S. PATENT DOCUMENTS 5,991,816 A * 11/1999 Percival et al. ............... 709/247

6,597,739 B1 * 7/2003 Li et al. ..................... 375/240.19
6,920,179 B1 * 7/2005 Anand et al. ............. 375/240.26
7,389,356 B2 * 6/2008 Shao et al. ..................... 709/235

FOREIGN PATENT DOCUMENTS

JP 2000-041149 2/2000

OTHER PUBLICATIONS

Beong-Jo Kim et al: "An Embedded Wavelet Video Coder Using Three-Dimensional Set Partitioning in Hierarchical Trees (SPIHT)" Data Compression Conference, 1997. DCC '97. Proceedings, IEEE, Mar. 1997, p. 251-260.
"Preliminary Notice of Reasons for Rejection" Japanese Patent Application No. 2011-072616, dated Feb. 14, 2013.

* cited by examiner

*Primary Examiner* — Nhon Diep
(74) *Attorney, Agent, or Firm* — Young Basile Hanlon & MacFarlane P.C.

(57) ABSTRACT

A method and apparatus for producing a fully scalable compressed representation of video sequences, so that they may be transmitted over networks, such as the Internet, for example. Because the signal is scalable, users receiving the signal can obtain the signal at the appropriate resolution and quality that their system will handle or that they desire. A "motion compensated temporal wavelet transform" is implemented in order to enable compression of the video in a scalable fashion while still taking advantage of inter-frame redundancy in a manner which is sensitive to scene and camera motion. The motion compensated temporal wavelet transform is implemented by decomposing the video sequence into a set of temporal frequency bands and then applying a sequence of motion compensated lifting operations to alternately update an odd frame sub-sequence based upon an even sub-sequence and vice versa in a manner which is sensitive to motion.

17 Claims, 6 Drawing Sheets

METHOD AND APPARATUS FOR SCALABLE COMPRESSION OF VIDEO

This application is a continuation of U.S. patent application Ser. No. 10/170,465, filed Jun. 14, 2002, which is a continuation-in-part and claims the priority of international application PCT/AU01/01660 filed Dec. 21, 2001, which claims priority of Australian Patent Application PR2225, filed Dec. 21, 2000.

FIELD OF THE INVENTION

The present invention relates generally to the processing of video signals so that video may be transmitted in a compressed form and, particularly, but not exclusively, relates to processing of video signals so that the video can be efficiently transmitted in a scalable form.

BACKGROUND OF THE INVENTION

Currently, most video content which is available over computer networks such as the Internet must be pre-loaded in a process which can take many minutes over typical modem connections, after which the video quality and duration can still be quite disappointing. In some contexts video streaming is possible, where the video is decompressed and rendered in real-time as it is being received; however, this is limited to compressed bit-rates which are lower than the capacity of the relevant network connections. The most obvious way of addressing these problems would be to compress and store the video content at a variety of different bit-rates, so that individual clients could choose to browse the material at the bit-rate and attendant quality most appropriate to their needs and patience. Approaches of this type, however, do not represent effective solutions to the video browsing problem. To see this, suppose that the video is compressed at bit-rates of R, 2R, 3R, 4R and 5R. Then storage must be found on the video server for all these separate compressed bit-streams, which is clearly wasteful. More importantly, if the quality associated with a low bit-rate version of the video is found to be insufficient, a complete new version must be downloaded at a higher bit-rate; this new bit-stream must take longer to download, which generally rules out any possibility of video streaming.

To enable real solutions to the remote video browsing problem, scalable compression techniques are required. Scalable compression refers to the generation of a bit-stream which contains embedded subsets, each of which represents an efficient compression of the original video with successively higher quality. Returning to the simple example above, a scalable compressed video bit-stream might contain embedded sub-sets with the bit-rates of R, 2R, 3R, 4R and 5R, with comparable quality to non-scalable bit-streams with the same bit-rates. Because these subsets are all embedded within one another, however, the storage required on the video server is identical to that of the highest available bit-rate. More importantly, if the quality associated with a low bit-rate version of the video is found to be insufficient, only the incremental contribution required to achieve the next higher level of quality must be retrieved from the server. In a particular application, a version at rate R might be streamed directly to the client in real-time; if the quality is insufficient, the next rate-R increment could be streamed to the client and added to the previous, cached bit-stream to recover a higher quality rendition in real time. This process could continue indefinitely without sacrificing the ability to display the incrementally improving video content in real time as it is being received from the server.

A major problem, however, is that highly efficient scalable video compression algorithms have not existed, either in practice or in the academic literature. Efficient scalable image compression algorithms have existed for some time, of which the most well known examples are the so-called embedded zero-tree algorithms initially proposed by (J. Shapiro, "An embedded hierarchical image coder using zerotrees of wavelet coefficients", *Data Compression Conference* (Snowbird, Utah), PP. 214-223, 1993 and later enhanced by A. Said and W. Pearlman, "A new, fast and efficient image codec based on set partitioning in hierarchical trees" *IEEE Trans. Circuits and Systems for Video Technology*, vol. 6, PP. 243-250, June 1996. In fact, many of the algorithms advanced for scalable video compression are essentially scalable image compression schemes, applied independently to the successive frames of the video sequence, see S. McCanne, M. Vetterli and V. Jacobson, "Low-complexity video coding for receiver-driven Layered Multicast," *IEEE Journal on Selected Areas in Communications*, vol. 15, August 97, PP. 983-1001. In order to compete with the efficiency of non-scalable techniques, however, it is essential that inter-frame redundancy be exploited in a manner which is sensitive to scene and camera motion.

Motion Compensated Prediction (MCP) is by far the most popular approach to exploit inter-frame redundancy for video compression. FIG. 1 illustrates the salient features of MCP compression, upon which key standards such as MPEG-1, MPEG-2, MPEG-4 and H.263, all rely. Rather than compressing each frame of the video sequence separately, the spatial transform, quantization and entropy coding elements common to image compression algorithms are applied to the difference between the current frame and a prediction of the frame formed by applying a motion compensation algorithm to the pixels in the previous frame, as reconstructed by the decompressor.

FIG. 1 is a schematic block diagram of a prior art arrangement for compressing video using a motion compensated prediction (MCP) feedback loop. It will be appreciated that the blocks shown in the diagram are implemented by appropriate hardware and/or software.

Block 1 is a frame delay and motion compensator. This stores the decoded version of a previous frame, using motion information (usually explicitly transmitted with the compressed data stream) to form a prediction of the current frame. The subtractor 2 subtracts the motion compensated predictor, produced by block 1, from the current video frame. The spatial transform block 3 decomposes the prediction residual frame produced by block 2 into separate components for coding. The separate components usually correspond to different spatial frequencies and are less correlated with each other than are the original samples of the prediction residual frame.

The quantisation block 4 approximates each of the transform coefficients, by a number of representative values, identified by labels (usually integers) which are readily coded. This step is a precursor to coding.

Block 5 is an entropy coder which produces a bit-stream which efficiently represents the quantisation labels produced by block 4, and which can be transmitted over a network.

The inverse quantisation block 6 uses the labels produced by block 4 to reconstruct representative values for each of the transform coefficients which were quantised by block 4.

The inverse transform block 7 is the inverse of the spatial transform operator.

Block 8 adds the decoded prediction residual recovered from block 7 to the predictor itself, thereby recovering a copy of the decoded video frame, identical to that which should be available at a decompressor.

MCP relies upon predictive feedback. It requires knowledge of the pixel values which would be reconstructed by the decompressor for previous frames. In a scalable setting, this knowledge is unavailable, because the pixel values reconstructed by the decompressor depend upon the particular subset of the embedded bit-stream which is actually received and decompressed. This problem has been primarily responsible for hampering the development of efficient highly scalable video compressors. MPEG-2 allows some small degree of scalability, but the useful extent of this capability is limited to two or three different quality subsets, and even then with significant loss in efficiency. Although MPEG-4 claims to be highly scalable, this claim is to be interpreted in regard to so-called "object scalability" which is limited to the number of "objects" in the scene, dependent upon appropriate segmentation algorithms and unable to provide smooth increments in video quality as a function of the bandwidth available to a remote client. Otherwise, MPEG-4 is constrained by the fundamental inappropriateness of MCP, upon which it relies to exploit inter-frame redundancy.

Two notable scalable video compression algorithms which have been proposed are those of J. Ohm, "Three dimensional sub-band coding with motion compensation," *IEEE Trans. Image Processing*, vol. 3, pp. 559-571, September 1994 and D. Taubman and A. Zakhor "Multi-rate 3-D sub-band coding of video," *IEEE Trans. Image Processing*, vol. 3, pp. 572-588, September 1994. In both cases, the idea is to use three-dimensional separable sub-band transforms without any predictive feedback, after first temporally shifting the video frames, or parts thereof, so as to improve the alignment of spatial features prior to application of the 3-D transform. Although these schemes work well for simple global translation, their performance suffers substantially when scene motion is more complex.

SUMMARY OF THE INVENTION

In accordance with a first aspect, the present invention provides a method of compressing a video sequence to produce a compressed video signal, including the steps of forming the video sequence into an input signal, decomposing the input signal into a set of temporal frequency bands, in a manner which exploits motion redundancy and, applying scalable coding methods to the decomposed input signal to generate a scalable compressed video signal.

One of the important features of the present invention is that motion redundancy is exploited directly by the decomposition into temporal frequency bands, thereby avoiding the need for predictive feedback. The decomposed input signal is therefore able to be coded in a scalable fashion.

Preferably, the step of decomposing the input signal comprises the further step of decomposing the temporal frequency bands into spatial frequency bands, to provide spatio-temporal frequency bands. As discussed later, it is sometimes desirable to rearrange the steps of temporal and spatial decomposition in a manner which allows efficient access to the video at various reduced sizes (spatial resolutions).

Motion compensation is preferably incorporated by separating the input signal into even and odd indexed frame sub-sequences, and applying a sequence of "motion compensationed lifting" operations to alternately update the odd frame sub-sequence based upon the even frame sub-sequence and vice versa. The low temporal frequency band is preferably further decomposed for a predetermined number of decomposition levels by recursively applying the lifting operations.

After further decomposition of the temporal bands into spatial frequency bands, the resulting spatio-temporal frequency bands are subjected to scalable coding methods to generate the scalable compressed video signal. Preferably, the samples belonging to each spatio-temporal frequency band are partitioned into blocks, such that each block is coded independently of the other, with the spatial and temporal dimensions of said blocks selected in such a manner as to provide efficient access into regions of interest within the video.

Preferably, the blocks are coded in an embedded manner, providing incremental contributions to embedded subsets in a digital bit stream. In this way, the embedded subsets can be selectively decoded by a computing system to enable a user to view the desired part of the video, at the desired available (scaled) resolution and quality.

In the preferred embodiment, the scalable bit-stream therefore contains distinct subsets corresponding to different intervals in time, different resolutions (both temporal and spatial) and different levels of quality; a client can interactively choose to refine the quality associated with specific time segments which are of the greatest interest. Further, the scalable bit-stream also may contain distinct subsets corresponding to different spatial regions and clients can then interactively choose to refine the quality associated with specific spatial regions over specific periods of time, according to their level of interest. In a training video, for example, a remote client in a network could interactively "revisit" certain segments of the video and continue to stream higher quality information for these segments from a network server, without incurring any delay.

The provision of a highly scalable compressed video signal, in accordance with the present invention, can facilitate interactive browsing of video signals by a computer on a network, such as the Internet, for example.

In accordance with a second aspect of the present invention, there is provided a method of providing for interactive remote browsing of compressed digital video signals, comprising the steps of:

making available to a network, by way of a server computing system connected to the network, a scalable compressed signal representing a video sequence, selecting, by way of a client computing system connected to the network, a portion of the scalable compressed signal for decompression and viewing as a video sequence, monitoring the choice of selection by the client, and selecting, by way of the client, a further portion of the scalable compressed signal of interest to the client.

Preferably, the client includes a cache which can store the portion of the signal which the client has viewed so far. If the client wishes to view a further portion of the signal associated with the same area of video (which may include temporal area as well as spatial area), all they need is a sufficient further portion of the signal to, for example, increase the resolution or quality and provide a more accurate rendition of the video. They do not need to be resent the entire signal. Preferably, the server also includes a cache monitoring means, which monitors the status of the client cache, so that the server knows what portion of the signal the client has already received and can determine what further portion of the scaled signal is required.

In accordance with a third aspect of the present invention, there is provided a method in accordance with the second aspect of the present invention wherein the scalable compressed signal is compressed by the method of the first aspect of the present invention.

In accordance with a fourth aspect of the present invention, there is provided a method of providing for interactive remote browsing of compressed digital video signals, comprising the steps of:

making available to a network, by way of a server computing system connected to the network, a scalable compressed signal representing a video sequence, monitoring the choice of selection of a portion of the scalable compressed signal for decompression and viewing as a video sequence by a client computing system, and making available a further portion of the scalable compressed signal to the client.

Preferably, the monitoring step is carried out by a monitoring means associated with the server computing system. Preferably, the monitoring means is a cache monitoring system which is arranged to monitor the status of a client cache, so that the server is aware of what portion of the signal the client has already received and can determine what further portion of the signal is required.

In accordance with a fifth aspect, the present invention provides a method of compressing a video sequence to produce a compressed video signal, including the steps of decomposing the video sequence into a set of temporal frequency side bands by separating the video sequence into even and odd indexed frame sub-sequences, and applying a sequence of motion compensated lifting operations to alternately update the odd frame-sequence based on the even frame-sequence and vice versa in a manner which is sensitive to motion, and applying coding methods to generate a compressed video signal.

In accordance with a sixth aspect, the present invention provides a system for compressing a video sequence to produce a compressed video signal, the system comprising means for forming the video sequence into an input signal, means for decomposing the input signal into a set of temporal frequency bands, in a manner which exploits motion redundancy, and a means for applying a scalable coding method to the decomposed input signal to generate a scalable compressed video signal.

In accordance with a seventh aspect, the present invention provides a system for providing for interactive remote browsing of compressed digital video signals comprising:

a server computing system arranged to be connected to a network and including means for providing a scalable compressed signal representing a video sequence for distribution on the network to a client computing system, a client computing system, including selection means for selecting a portion of the scalable compressed signal, a decompressor for decompressing the scalable signal for viewing as a video sequence, the selection means being arranged to select further portions of the scalable signal relating to regions of interest of the client.

In accordance with an eighth aspect, the present invention provides a system for providing for interactive remote browsing of a compressed digital video signal, comprising:

a server computing system arranged to be connected to a network and including means for providing a scalable compressed signal representing a video sequence for distribution over the network to a client computing system, the server computing system including a monitoring means for monitoring the choice of selection of a portion of the scalable compressed signal for decompression and viewing as a video sequence by the client computing system, and being arranged to provide a further portion of the scalable compressed signal of interest to the client when requested.

Preferably, the monitoring means includes a cache monitoring means which monitors the status of a client cache, so that the server computing system is aware of what portion of the signal the client has already received and can determine what further portion of the signal is required.

In accordance with a ninth aspect, the present invention provides an apparatus for compressing a video sequence to produce a compressed video signal, comprising means for decomposing the video sequence into a set of temporal bands, and separating the input signal into even and odd index frame sub-sequences and applying a sequence of motion compensated lifting operations to alternately update the odd frame sub-sequence based upon the even frame sub-sequence and vice versa in a manner which is sensitive to motion.

In accordance with an tenth aspect, the present invention provides a method in accordance with the first aspect of the invention, comprising the steps of applying method steps which are the inverse of the steps of a method in accordance with the first aspect of the invention.

In accordance with an eleventh aspect, the present invention provides a decompressor system including means for applying a method in accordance with the eighth aspect of the invention.

In accordance with a twelfth aspect, the present invention provides a computer program arranged, when loaded onto a computing system, to control the computing system to implement a method in accordance with the first aspect of the invention.

In accordance with an thirteenth aspect, the present invention provides a computer readable medium, arranged to provide a computer program in accordance with the tenth aspect of the invention.

In accordance with a fourteenth aspect, the present invention provides a system where the client includes a cache arranged to store portions of the scalable signal and the server includes a cache monitor arranged to monitor the client to enable the server to determine what portions of the signal are stored in the client cache, whereby the server, on request of the client for a region of interest video, may send the client only the further portions of signal they require to reproduce the region of interest.

In accordance with a fifteenth aspect, the present invention provides a method of storing video data in a surveillance system, comprising the steps of storing the video data in scalable data format, wherein the scalable video data is produced in accordance with the method of the first aspect of the invention.

In accordance with sixteenth aspect, the present invention provides a method of implementing heterogenous multi cast, comprising the steps of providing a scalable video data source and distributing the scalable video data source to a plurality of devices over a plurality of communications channels, at a bit rate commensurate with the particular communication channels, wherein the scalable video data is produced in accordance with the method of the first aspect of the invention.

In accordance with a seventeenth aspect, the present invention provides a method of providing a video signal for use in telemedicine, comprising the steps of transmitting a scalable video data signal over a communications channel for browsing by a telemedicine operative, wherein the scalable video data is produced in accordance with the method of the first aspect of the invention.

In accordance with an eighteenth aspect, the present invention provides A system for distributing a scalable video signal to a receiving device, comprising means for generating a scalable video signal, means for real-time streaming of a sub-set of the scalable video signal to the receiving device, and storage means for storing remaining portions of the scalable video signal for later on-forwarding to the device, if required.

Preferably, the system is a surveillance system or a security system. Preferably, the sub-set of the scalable video signal is streamed in real-time.

In accordance with a nineteenth aspect, the present invention provides a system for implementing digital cinema, comprising a means for storing a digital cinema signal in scalable data format, wherein the scalable data video signal is produced in accordance with the method of the first aspect of the present invention.

In accordance with a twentieth aspect, the present invention provides a surveillance system, including means for storing surveillance video data in scalable video data format, wherein the scalable data video signal is produced in accordance with the method of the first aspect of the present invention.

In accordance with a twenty first aspect, the present invention provides a heterogeneous multi cast system, comprising a scalable video data source and distribution means arranged to distribute the scalable video source to a plurality of devices over a plurality of communications channels, at a bit rate commensurate with the particular communication channels, wherein the scalable data video signal is produced in accordance with the method of the first aspect of the present invention.

In accordance with a twenty second aspect, the present invention provides a telemedicine system, comprising means for transmitting a scalable video data signal from a operating theatre over a communications channel for browsing by a telemedicine operative, wherein the scalable data video signal is produced in accordance with the method of the first aspect of the present invention.

In accordance with a twenty third aspect, the present invention provides a method of distributing a scalable video signal to receiving device, comprising the steps of streaming a sub set of the scalable data video signal to the receiving device and storing the remaining portions of the video signal in a storage means for later on-forwarding if required.

Preferably, the receiving device and storage means form part of a surveillance or security system. Preferably, the sub-set of scalable data video signal is streamed to the receiving device in real-time.

In accordance with a twenty fourth aspect, the present invention provides a method of distributing a scalable video data signal over a plurality of distinct communication channels, comprising the steps of streaming the scalable video signal at the bit rate commensurate with the particular communication channel, and providing switch means in the communication channel network to determine the communication channels capacity and to stream video of the appropriate capacity for the channel.

In accordance with a twenty fifth aspect, the present invention provides a method of implementing digital cinema, comprising the steps of storing a digital cinema signal in scalable data format, wherein the scalable data cinema signal is produced in accordance with the method of the first aspect of the present invention.

BRIEF DESCRIPTION OF THE DRAWINGS

Features and advantages of the present invention will become apparent from the following description of embodiments thereof, by way of example only, with reference to the accompanying drawings, in which.

DETAILED DESCRIPTION OF PREFERRED EMBODIMENTS OF THE INVENTION

Figure 1:
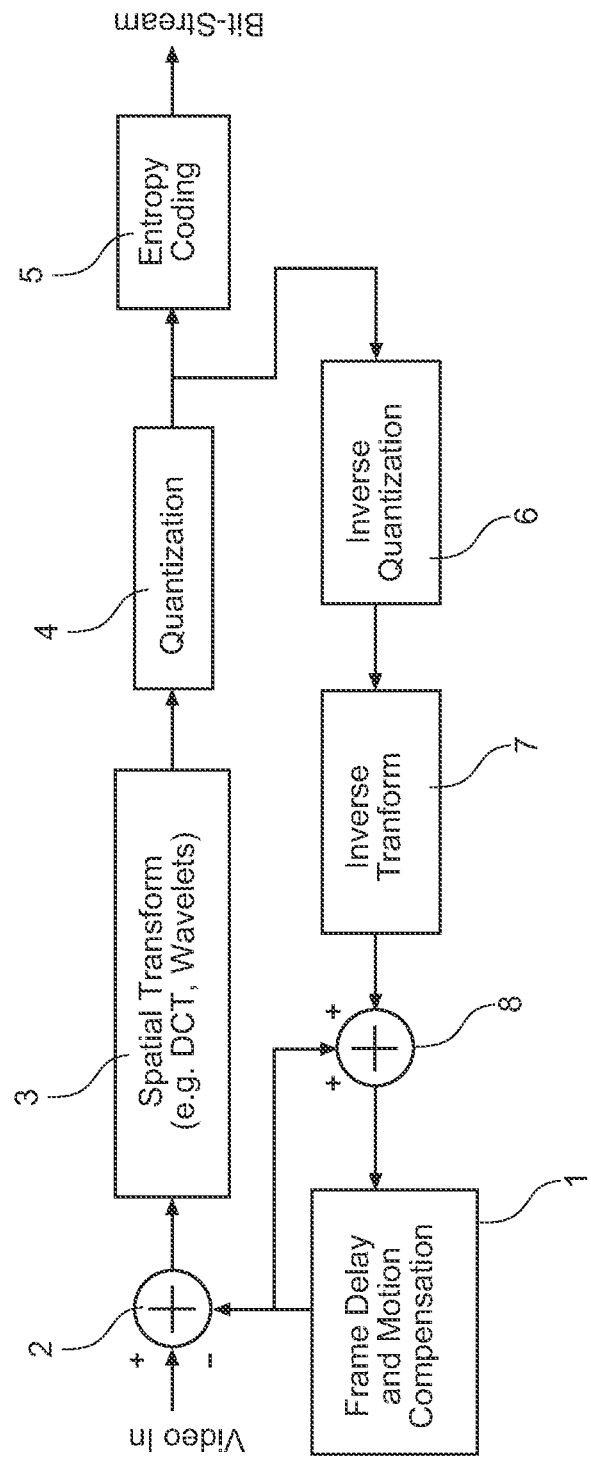
FIG. 1 is a schematic block diagram illustrating compression and coding of a video signal utilizing Motion Compensated Prediction feedback loop (prior art)

As mentioned already, the most fundamental obstacle to the development of effective scalable video compression technology is the difficulty of exploiting inter-frame redundancy within a highly scalable framework. In place of MCP, the most successful approaches in the past have focused on the use of the Haar Wavelet in the temporal domain, generating temporal low- and high-pass sub-bands corresponding to the average and difference of adjacent frames. The Wavelet transform is iterated along the low-pass channel, generating further low- and high-pass sub-bands from the low-pass channel in a recursive manner. To minimize memory requirements, this is usually continued for only two or three iterations so that the lowest frequency temporal sub-band might represent the average of 8 adjacent frames.

In order to compensate for motion, the individual frames can be pre-warped in a manner which aligns common spatial features in adjacent frames. This is the key idea in D. Taubman and A. Zakhor, "Multi-rate 3-D sub-band coding of video," *IEEE Trans Image Processing*, vol. 3, pp. 572-588, September 1994 and is related to the approach of J. Ohm, "Three dimensional sub-band coding with motion compensation," *IEEE Trans. Image Processing*, vol. 3, pp. 559-571, September 1994; however, the warping must be invertible or very nearly so, in order to ensure efficient compression and ensure that the original video sequence can be recovered in the absence of quantisation error introduced during subsequent coding stages. The invertibility requirement limits the spatial warpings and hence the types of scene motion which can be captured, to translations and skew approximations to rotation. It is impossible to capture the local expansions and contractions associated with camera zoom and scene object motion through warping individual frames, without violating the invertibility requirement. In some proposed schemes e.g. J. Tham, S. Ranganath and A. Kassim, "Highly scalable wavelet-based video code for very low bit-rate environment," *IEEE Journal on Selected Areas in Communications*, vol. 16, January 1998, pp. 12-27, the invertibility requirement is deliberately violated, so that high quality reconstruction is impossible.

In order to effectively exploit inter-frame redundancy under complex scene motion, the temporal Wavelet transform and motion compensation operations are performed jointly in the present invention. We call the resulting transform a Motion Compensated Temporal Wavelet Transform (MCTWT). The implementation of the MCTWT is based upon the lifting mechanism for realising Wavelet transforms, see R. Calderbank, I. Daubechies, W. Sweldens and B. Yeo, "Wavelet transforms that map integers to integers," *Applied and Computational Harmonic Analysis*, vol. 5, pp. 332-369, July 1998.

In the specific case of the Haar Wavelet, the invention is most easily understood as a generalization of the well-known S-Transform. Specifically, let $x_k[m,n]$ denote the sequence of frames from the video sequence. The lifting steps in the MCTWT transform the even and odd frame sub-sequences, $x_{2k}[m,n]$ and $x_{2k+1}[m,n]$, into low and high-pass temporal sub-bands, respectively. Let $W_{i,j}$ denote the motion compensated mapping of frame $x_i[m,n]$, onto the coordinate system of frame $x_j[m,n]$, so that $(W_{i,j}(x_i)[m,n] \approx x_j[m,n]$, $\forall m,n$. If $i<j$, the mapping $W_{i,j}$ corresponds to what is commonly known as forward motion compensation, as used in elementary motion compensated prediction algorithms. If $i>j$, the mapping $W_{i,j}$ corresponds to what is commonly known as backward motion compensation, as used in bi-directional motion compensated prediction algorithms. In various embodiments of the invention these motion compensated mappings may correspond to conventional block based motion compensation, whose underlying motion model is piecewise constant, or more complex mesh based motion compensation, whose underlying motion model is a continuous interpolation of motion vectors on a control grid. Other motion compensation mappings may also be applied in various embodiments of the invention, and the invention is not limited to any particular type. Within the context of the MCTWT, the high-pass sub-band's frames are given by $$h_k[m,n] = x_{2k+1}[m,n] - (W_{2k,2k+1}(x_{2k}))[m,n] \quad (1)$$

while the low-pass temporal sub-band samples are given by $$l_k[m,n] = x_{2k}[m,n] + \frac{1}{2}(W_{2k+1,2k}(h_k))[m,n] \quad (2)$$

Evidently, when there is no motion, so that $W_{i,j}$ is the identity operator for all i,j, this sequence of two lifting steps reduces to the Haar Wavelet transform (up to a scale factor).

The approach is readily extended to more complex Wavelet transforms, involving more lifting steps, or lifting steps with larger kernels. A further example is based upon the well-known bi-orthogonal 5-3 Wavelet transform, both for completeness and because this example can be preferable to the Haar example given above for some embodiments of the invention. In this case, the high-pass MCTWT samples become $$h_k[m,n] = \quad (3)$$
$$x_{2k+1}[m,n] - \frac{1}{2}\{(W_{2k,2k+1}(x_{2k}))[m,n] + (W_{2k+2,2k+1}(x_{2k+2}))[m,n]\}$$

while the low-pass temporal sub-band samples are given by $$l_k[m,n] = x_{2k}[m,n] + \frac{1}{4}\{(W_{2k-1,2k}(h_{k-1}))[m,n] + (W_{2k+1,2k}(h_k))[m,n] \quad (4)$$

Again, when there is no motion, this sequence of two lifting steps reduces to the 5-3 bi-orthogonal Wavelet transform. It is interesting to note that the high-pass sub-bands in the case of the Haar example are formed in a manner which is consistent with conventional motion compensated prediction, while the high-pass sub-bands in the case of the 5-3 example are formed in a manner which is consistent with bi-directional motion compensated prediction. Unlike motion compensated prediction schemes, however, the present embodiment achieves perfect reconstruction without introducing the feedback loop which works against effective scalable compression in existing video compression standards.

As with conventional ID Wavelet transforms, the MCTWT may be recursively applied to the low pass sub-band to yield a hierarchy of temporal resolution levels. In preferred embodiments, this process is carried on three or four times so that the lowest frequency temporal sub-band has a frame rate which is one eighth or one sixteenth that of the original video sequence.

The temporal sub-bands produced by the MCTWT described above are further decomposed into spatial sub-bands by means of a spatial wavelet transform. Alternatively, other transforms such as the Discrete Cosine Transform (DCT) may be employed. These spatial transforms and their various forms and structure are well known to those skilled in the art. The result is the division of the original video sequence into a collection of spatio-temporal sub-bands.

The sequence of frames representing each of the spatio-temporal sub-bands is partitioned into code-blocks, where each code-block has a given spatial and temporal extent. In various embodiments of the invention, the extent of the code-blocks vary from sub-band to sub-band and may in one or more sub-bands be such as to span a single frame of the respective sub-band. In the preferred embodiment of the invention, code-blocks have relatively small spatial and temporal extents with a total volume of several thousand samples. For example, the spatial extent might be 32×32 or 16×16 with a temporal extent of 4 frames.

A completely independent embedded bit-stream is generated for every code-block. The embedded bit-stream for each code-block, $B_i$, may be truncated to any of a number of distinct lengths, $R_i^n$, such that each truncated bit-stream corresponds to a suitably efficient representation of the original sample values, in the rate-distortion sense. Efficient embedded block coding algorithms have been introduced for image compression in the form of the EBCOT algorithm, see D. Taubman, "EBCOT: Embedded block coding with optimized truncation," *ISO/IEC JTC 1/SC 29/WG1 N1020R*, October 1998 and the JPEG2000 image compression standard. A similar embedded block coding algorithm is used in the preferred embodiment of the invention. In various embodiments, however, any embedded entropy coding algorithm with similar properties may be used to generate the bit-streams, $B_i$.

One of the most important attributes of embedded block coding is that the separate embedded bit-streams may be optimally truncated so as to minimize distortion for a given constraint on the overall bit-rate. Moreover, the optimum truncation lengths for each code-block are non-decreasing functions of the target bit-rate. This means that the optimally truncated block bit-streams corresponding to an overall compressed bit-rate of R constitute a subset of the optimally truncated block bit-streams for an overall compressed bit-rate of say 2R, and so on. This is exactly the scalability property required to enable the remote video browsing applications discussed above. Block truncation strategies which seek to minimize distortion for a given bit-rate, or minimize bit-rate for a given level of distortion are known as Post Compression Rate-Distortion (PCRD) optimization strategies. PCRD optimization schemes which optimize perceptual video quality are described in a separate application [visual99]. However, in various embodiments, different strategies may be employed to determine the block truncation points.

Compressed video bit-streams composed of independent embedded block bit-streams possess a number of additional attributes which are of great relevance to remote video browsing applications. Lower resolution versions of the video sequence may be reconstructed by discarding the code-blocks corresponding to higher spatial frequency sub-bands (for lower spatial resolution) or higher temporal frequency sub-bands (for lower temporal resolution). Each code-block has a well defined temporal extent (number of frames) so that improvements in reconstructed video quality may be selectively requested for different temporal segments by retrieving additional portions of the relevant embedded bit-streams. Finally, each code-block has a well defined spatial extent. Specifically, the set of code-blocks which are required to reconstruct a given spatial region of interest may be computed from the code-block dimensions, the support of the Wavelet basis functions, and the relevant motion parameters, thereby enabling interactive browsing modalities where the reconstructed video quality is selectively improved only in a particular spatial region of interest.

As already mentioned, PCRD optimization schemes may be used to generate multiple sets of optimal block truncation points, corresponding to successively higher overall video bit-rates or quality levels. These are grouped in quality layers within the final compressed video bit-stream: the first quality layer contains the truncated block bit-streams corresponding to the lowest bit-rate; subsequent quality layers contain the incremental contributions from each code block's embedded bit-stream which are required to achieve successively higher reconstructed video quality, at higher overall bit-rates. In this way, the final bit-stream consists of a collection of code-blocks which together span the entire spatial and temporal extent of the video sequence, whose embedded bit-streams are separated into quality layers. The final step is to augment the bit-stream with mechanisms to efficiently identify the layer contributions of each of the code blocks, so that all but the relevant portions of the bit-stream may be stripped to meet the needs of a particular user or application. Various embodiments may choose to represent this information in different ways.

Figure 2:
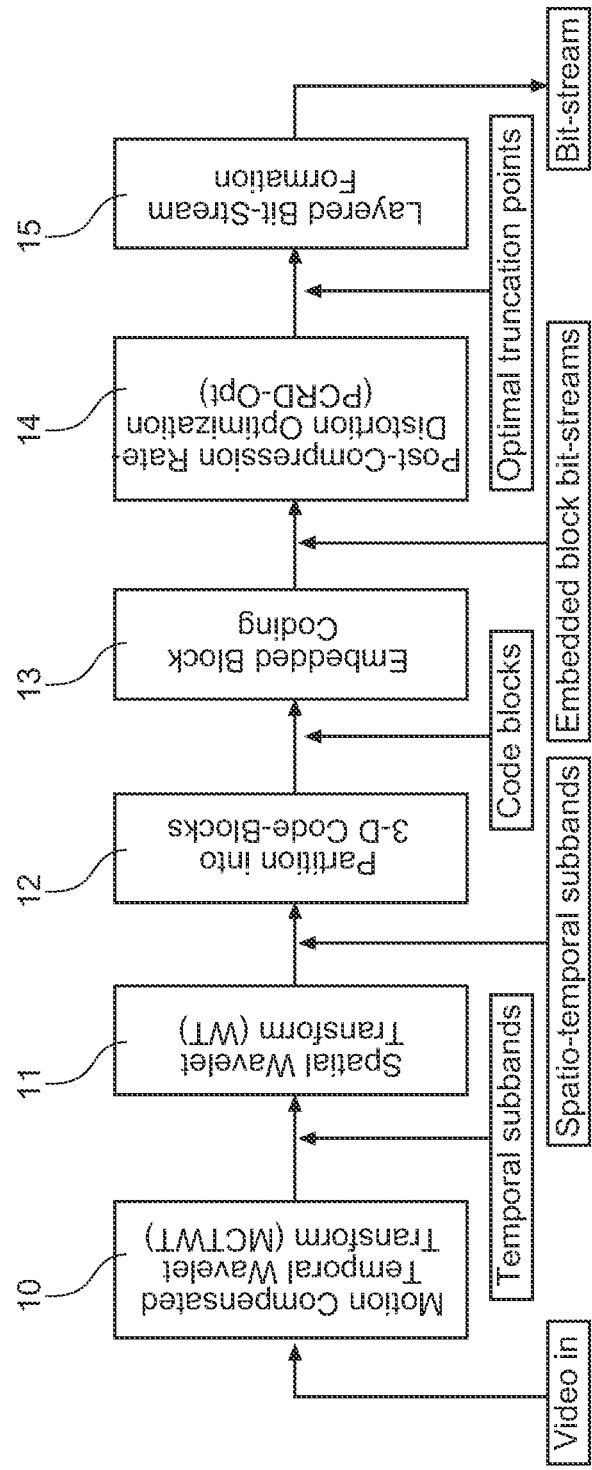
FIG. 2 is a schematic block diagram of a video compression system in accordance with an embodiment of the present invention.

FIG. 2 illustrates an implementation of an embodiment of the present invention, as discussed above. It will be appreciated that the blocks shown in FIG. 2 can be implemented by appropriate software and hardware in a computing device or system.

Referring to FIG. 2, reference numeral 10 designates an arrangement which implements the MCTWT. This block processes a sequence of video frames, creating two or more temporal sub-bands. In the simplest case, there are two sub-bands, each having half the frame rate of the original video sequence. The low frequency sub-band contains good rendition of the video at half of the full frame rate, while the other (high frequency) sub-band contains details which are not predictable from the low frequency sub-band. As discussed above, the low frequency sub-band is preferably split into high and low frequency components. Such splitting then continues for a predetermined number of "temporal decomposition levels".

Block 11 processes each frame in each temporal sub-band generated by Block 10, decomposing it into spatial sub-bands.

Block 12 groups the samples within each spatio-temporal sub-band produced by Block 11 into blocks spanning a given number of frames and having a given width and height within the sub-band. The blocks are coded independently from one another. Note that different embodiments and different sub-bands may use different block dimensions.

Block 13 generates an embedded bit-stream for each code-block. The embedded bit-stream has the property that as more of the bit-stream is received (made available to a decoder), the quality of the sub-band samples represented by the code-block improves progressively.

Block 14 determines an optimal number of bits from each code-block's embedded bit-stream to include in the final compressed data stream, subject to constraints on the compressed bit-rate or the quality of the reconstructed video. In a preferred embodiment, as discussed above, the PCRD optimization algorithm block runs multiple times, creating a succession of layers within the compressed data stream, representing successively higher overall compressed bit-rate and video quality, such that each layer contains an optimal distribution of contributions from each code-block's embedded bit-stream. In the preferred embodiment, the PCRD algorithm should be sensitive to the relative importance of different spatio-temporal sub-bands to a human viewer, as a function of the activity in the video.

Block 15 assembles the code-block contributions, whose lengths are optimized by Block 14, into a final compressed data representation consisting of one or more video quality layers, together with all required information to recover the code-block contributions associated with each layer from the data stream. This identifying information allows subsets of the final compressed data stream to be readily extracted, corresponding to successfully lower bit-rate and lower quality renditions of the video.

It will be appreciated that decompression is the inverse of compression, and a skilled person would be able to design an appropriate decompressor and implement an appropriate decompression method from the above description of the compression method and compressor. Invertibility is a direct consequence of the lifting structure used to implement the forward transformation operations associated with the compression process.

The provision of a highly scalable compressed video signal which can be transmitted over networks facilitates interactive remote browsing of compressed video. A further aspect of the present invention relates to a system and method for interactive remote browsing of scalable compressed video.

Figure 3:
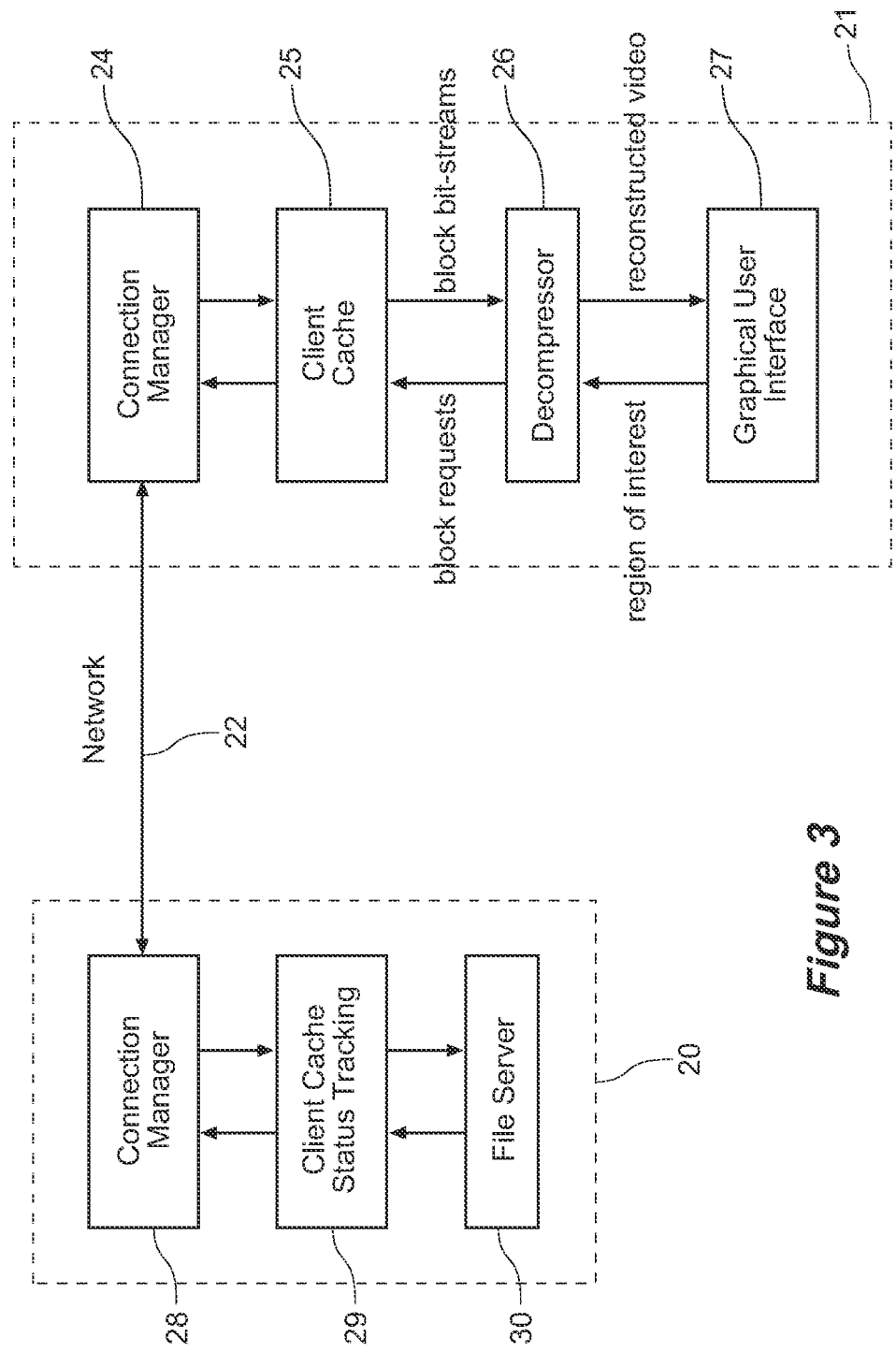
FIG. 3 is a schematic block diagram illustrating a system for interactive remote browsing of scalable compressed video, in accordance with an embodiment of the present invention.

FIG. 3 is a block diagram illustrating a server computing system 20 and a client computing system 21 connected by a network 22. As illustrated, the server 20 and the client 21 show the key elements in the system in accordance with the present embodiment for interactive remote browsing of scalable compressed video.

The client 21 includes a connection manager 24, a client cache 25, a decompressor 26 and a graphical user interface 27. The server 21 includes a connection manager 28, a subsystem 29 to maintain information concerning the status of the client's cache 25, and a file server 30.

The connection managers 24 and 28 manage the transfer of elements from the scalable compressed data stream between the server 21 and the client 22. The connection manager includes two components, one on the server 21 side and one on the client 22 side. It handles network transmission of the compressed data, acknowledgment of received data, monitoring of network conditions and so forth. Various embodiments may implement this block differently, depending upon the communication medium and the level of responsiveness required for effective user interaction.

The client cache 25, stores compressed data transmitted by the server 21, implementing an advertised policy for discarding old data when the cache becomes too full. Various embodiments may use different caching strategies, subject only to the requirement that the server 21 should have some knowledge of the client's 22 cache capabilities from which to predict some or all of its state.

The client cache status tracking block 29 maintains a mirror image of the state of the client's cache 25, recording the identity of the compressed data elements which the client 22 is believed to have received and stored. This element replicates the advertised caching strategy employed by the client 22 to identify elements which may have been discarded from the client's cache. The client 22 need not necessarily discard these, but it must not discard elements which the server's cache tracking block 29 would predict as having been cached.

The file server 30 interacts with the scalable compressed video data stream and also with the client cache status tracking arrangement 29, using knowledge of the client's current region of interest within the video, to determine which elements of the compressed data stream should be transmitted to the client to maximise the perceived video quality. These elements are sent to the connection manager via block 29 which updates its model of the contents of the client's cache on the way.

The decompressor 26 interacts with the client cache 25 to recover elements of the compressed data stream which are relevant to the current time instant, resolution and spatial region over which the video is to be rendered into a user-defined view port, decompressing and rendering those elements as required.

The graphical user interface 27 interacts with the user, accepting and interpreting commands identifying the user's region of interest within the video (including the spatial and temporal resolution of interest), sending this information periodically to the server and invoking the decompressor 26 to render the required video content, using all relevant information which is available in the cache. The graphical user interface 27 is also responsible for determining an appropriate delay between user requests and rendering of available data so as to give the server time to download at least some relevant elements from the compressed data stream. There is no requirement that all relevant compressed data be retrieved before rendering can commence. Compressed data which arrives late to the cache may be found useful if an interactive user instructs the system to go back over the same portion of the video sequence, rendering it again.

In operation, the user specifies a spatio-temporal region of interest, optionally including information concerning the maximum spatial and temporal resolutions of interest. The region of interest may include the entire video sequence, or any subset thereof in space or time. The region of interest request is conveyed to the decompressor which sends requests to the client's cache and decompresses the returned code-block contributions as they arrive so as to satisfy the user's request. The cache, in turn, identifies the code-block contributions which must be requested from the server and forms an appropriate compact request to be sent to the server via the network connection manager. This server request is formed based upon the current contents of the cache and estimates of the state of the connection so as to enable streaming video delivery with a high degree of likelihood. Thus, if the region of interest is entirely new so that all information must be retrieved directly from the server, only the initial quality layers of the scalable bit-stream will be requested. On the other hand, if the region of interest has been visited before, a higher quality service will be sustainable in real time, since only those components which do not already exist in the cache need be supplied by the server over the limited network connection.

The server optionally maintains a map of the contents of the client's cache. This enables the client to send its requests in a compact form, since the server is able to determine the actual code-block contributions which are required to satisfy the request without resending information already stored in the client's cache. The server organises the required code-block segments into an appropriate sequence, so as to facilitate real time decompression in the client as the material is streamed from the server.

In some embodiments of the invention, the server may generate requests automatically on behalf of the client during idle periods when the client is silent. For example, once a request has been satisfied, the server might send successively higher quality layers from code-blocks in the vicinity of the end point of the request, until further requests are received. In this way, the final frame in the user's requested region of interest will experience continually improving quality once the request has been satisfied. In other embodiments of the invention, alternative policies may be defined to determine the nature of the information which will be sent, if any, to a silent client.

In the embodiment described above with reference to FIG. 2 it is possible to reconstruct the video at a reduced spatial resolution after discarding some of the higher spatial frequency sub-bands produced by a spatial wavelet transform. One significant drawback of this approach, however, is that the amount of motion information does not scale with the spatial resolution.

Figure 4:
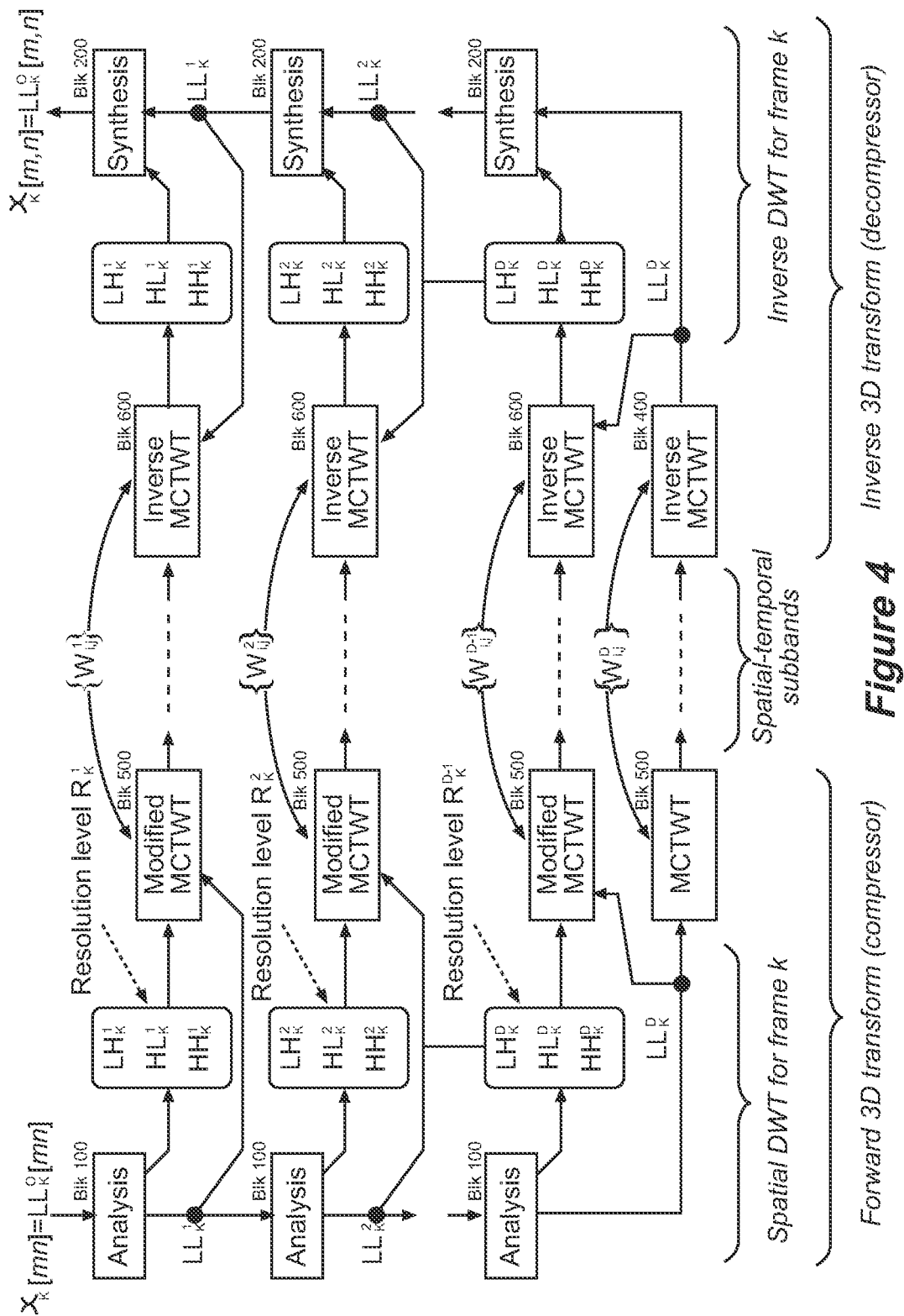
FIG. 4 is a schematic block diagram of a further embodiment of a compression system in accordance with the present invention, implementing spatial resolution scalable compression.

For applications requiring spatial resolution scalability, an alternative embodiment of the invention is preferred, in which a multi-resolution transform is first used to decompose each original image frame, $x_k[m,n]$ into spatial sub-bands and the MCTWT is then applied to the sub-bands. In the discussion which follows, the multi-resolution spatial transform is taken to be a two dimensional discrete wavelet transform (DWT). FIG. 4 is a block diagram of a system for implementing spatial resolution scalable compression.

As shown in FIG. 4, each original frame $x_k[m,n]$ is initially transformed into a reduced resolution image, $LL_k^1[m,n]$, together with three high frequency detail images, denoted $LH_k^1[m,n]$, $HL_k^1[m,n]$ and $HH_k^1[m,n]$. Each of these sub-band images has dimensions roughly half as large as those of the original image, and the total number of samples in all sub-bands is identical to the number of samples in the original image. We express this initial stage of spatial wavelet analysis as $$\begin{pmatrix} LL_k^1 \\ LH_k^1 \\ HL_k^1 \\ HH_k^1 \end{pmatrix} = \text{analysis}(x_k) = \begin{pmatrix} analysis_{LL}(x_k) \\ analysis_{LH}(x_k) \\ analysis_{HL}(x_k) \\ analysis_{HH}(x_k) \end{pmatrix}$$

Iterative application of the analysis operator decomposes $LL_k^1[m,n]$ into an even lower resolution image, $LL_k^2[m, n]$ together with additional detail sub-bands, $LH_k^2[m,n]$, $HL_k^2[m,n]$ and $HH_k^2[m,n]$. Continuing in this way, a D level transform produces a total of 3D+1 sub-bands, not counting the intermediate sub-bands, $LL_k^1[m,n]$ through $LL_k^{D-1}[m,n]$.

Importantly, each analysis stage is invertible. The inverse operators are known as synthesis stages and their operation is expressed as $$LL_k^{d-1} = \text{synthesis}(LL_k^d, LH_k^d, HL_k^d, HH_k^d)$$

where $x_k[m,n]$ is conveniently identified with a level 0 sub-band, $LL_k^0[m,n]$.

In the preferred embodiment of the invention, the MCTWT techniques developed previously are first applied directly to the lowest resolution sub-band frames, $LL_k^D$ as shown in FIG. 4. This MCTWT uses its own motion information, tailored to match the spatial resolution of the $LL_k^D$ frames. In the specific example of the motion compensated temporal 5-3 wavelet transform, equations (3) and (4) become equations (5) and (6) below. Note that the prefixes "H-" and "L-" are used here to identify high- and low-pass temporal sub-bands, respectively. The superscript, D, in the motion compensated mapping operators, $W_{i,j}^D$ associate them with the lowest spatial resolution frames in the D-level DWT.

$$H - LL_k^D[m,n] =$$  (5)
$$LL_{2k+1}^D[m,n] - \frac{1}{2}\{(W_{2k,2k+1}^D(LL_{2k}^D))[m,n] + (W_{2k+2,2k+1}^D(LL_{2k+2}^D))[m,n]\}$$

and $$\begin{pmatrix} H - LH_k^d \\ H - HL_k^d \\ H - HH_k^d \end{pmatrix} = \begin{pmatrix} LH_{2k+1}^d \\ HL_{2k+1}^d \\ HH_{2k+1}^d \end{pmatrix} - \frac{1}{2}\begin{pmatrix} analysis_{LH}(W_{2k,2k+1}^{d-1}(\text{synthesis}(LL_{2k}^d, LH_{2k}^d, HL_{2k}^d, HH_k^d))) \\ analysis_{HL}(W_{2k,2k+1}^{d-1}(\text{synthesis}(LL_{2k}^d, LH_{2k}^d, HL_{2k}^d, HH_k^d))) \\ analysis_{HH}(W_{2k,2k+1}^{d-1}(\text{synthesis}(LL_{2k}^d, LH_{2k}^d, HL_{2k}^d, HH_k^d))) \end{pmatrix} -$$  (7)

$$\frac{1}{2}\begin{pmatrix} analysis_{LH}(W_{2k+2,2k+1}^{d-1}(\text{synthesis}(LL_{2k+2}^d, LH_{2k+2}^d, HL_{2k+2}^d, HH_{2k+2}^d))) \\ analysis_{HL}(W_{2k+2,2k+1}^{d-1}(\text{synthesis}(LL_{2k+2}^d, LH_{2k+2}^d, HL_{2k+2}^d, HH_{2k+2}^d))) \\ analysis_{HH}(W_{2k+2,2k+1}^{d-1}(\text{synthesis}(LL_{2k+2}^d, LH_{2k+2}^d, HL_{2k+2}^d, HH_{2k+2}^d))) \end{pmatrix}$$

and $$\begin{pmatrix} L - LH_k^d \\ L - HL_k^d \\ L - HH_k^d \end{pmatrix} =$$  (8)

$$\begin{pmatrix} LH_{2k}^d \\ HL_{2k}^d \\ HH_{2k}^d \end{pmatrix} + \frac{1}{4}\begin{pmatrix} analysis_{LH}(W_{2k-1,2k}^{d-1}(\text{synthesis}(\overline{H-LL_{k-1}^d}, H-LH_{k-1}^d, H-HL_{k-1}^d, H-HH_{k-1}^d))) \\ analysis_{HL}(W_{2k-1,2k}^{d-1}(\text{synthesis}(\overline{H-LL_{k-1}^d}, H-LH_{k-1}^d, H-HL_{k-1}^d, H-HH_{k-1}^d))) \\ analysis_{HH}(W_{2k-1,2k}^{d-1}(\text{synthesis}(\overline{H-LL_{k-1}^d}, H-LH_{k-1}^d, H-HL_{k-1}^d, H-HH_{k-1}^d))) \end{pmatrix} +$$

$$\frac{1}{4}\begin{pmatrix} analysis_{LH}(W_{2k-1,2k}^{d-1}(\text{synthesis}(\overline{H-LL_k^d}, H-LH_k^d, H-HL_k^d, H-HH_k^d))) \\ analysis_{HL}(W_{2k-1,2k}^{d-1}(\text{synthesis}(\overline{H-LL_k^d}, H-LH_k^d, H-HL_k^d, H-HH_k^d))) \\ analysis_{HH}(W_{2k-1,2k}^{d-1}(\text{synthesis}(\overline{H-LL_k^d}, H-LH_k^d, H-HL_k^d, H-HH_k^d))) \end{pmatrix}$$

-continued $$L - LL_k^D[m,n] = LL_{2k}^D[m,n] +$$  (6)
$$\frac{1}{4}\{(W_{2k-1,2k}^D(H - LL_{k-1}^D))[m,n] + (W_{2k+1,2k}^D(H - LL_k^D))[m,n]\}$$

Each successive set of detail sub-bands, $LH_k^d$, $HL_k^d$ and $HH_k^d$ collectively form a "resolution level" $R_k^{d-1}$ where d runs from D down to 1. Resolution level $R_k^{d-1}$ holds the information required to augment the spatial resolution from $LL_k^d$ to $LL_k^{d-1}$ (through spatial sub-band synthesis). As indicated in FIG. 4, each resolution level has its own MCTWT, with its own motion information, tailored to match the spatial resolution of the $LL_k^{d-1}$ frames. The associated motion compensated mapping operators are denoted $W_{i,j}^{d-1}$.

The MCTWT for any given resolution level, $R_k^{d-1}$ is similar in principle to that described hitherto, with the exception that effective motion compensation should be performed in the domain of the spatially synthesized frames, $LL_k^{d-1}$. The temporal lifting steps are applied directly to the detail sub-bands, but whenever motion compensation is required, the detail sub-bands in the resolution level are jointly subjected to spatial synthesis to recover a baseband image with the same resolution as $LL_k^{d-1}$; motion compensation is applied in this domain, followed by sub-band analysis, which yields the motion compensated detail sub-bands. To minimize spatial aliasing effects which can interfere with the quality of the motion compensation and hence the compression efficiency of the overall transform, some information is borrowed from the lower resolution frames, $LL_k^d$ as shown in FIG. 4. This information is available at both the compressor and the decompressor, since lower spatial resolutions can be reconstructed first, without reference to higher spatial resolutions.

For illustrative purposes, consider again the motion compensated 5-3 wavelet transform. The lifting steps for resolution level $R_k^{d-1}$ employ motion compensation operators, $W_{i,j}^{d-1}$ applying them in accordance with equations (7) and (8) below.

The terms, $\overline{H-LL_k^d}$ appearing in equation (8) above, are designed to make the synthesised frames, to which the motion compensation is actually applied, resemble those which would appear if the relevant lifting steps were applied directly at video resolution, $LL_k^{d-}$. For the entire transform to remain invertible, it is essential that $\overline{H-LL_k^d}$ be based only on information from video resolution, $LL_k^d$.

In some embodiments, these terms can all be set to 0, at the expense of some uncompensated aliasing effects as the detail sub-bands are synthesized, motion compensated and re-analyzed. In other embodiments, $\overline{H-LL_k^d}$ may be obtained by spatially synthesizing sub-bands $H-LL_k^D$, $H-LH_k^D$, . . . , $H-HH_k^{d+1}$.

In the preferred embodiment, $\overline{H-LL_k^d}$ is obtained by interpolating the $LL_k^d$ frames (these are available to both the compressor and the decompressor, after reconstruction) through one stage of spatial synthesis (with all detail sub-bands set to 0), applying the motion compensated temporal lifting steps in this interpolated domain, and then recovering $\overline{H-LL_k^d}$ through spatial DWT analysis of the temporal sub-band, $H-LL_k^{d-1}$ discarding the detail sub-bands produced by the analysis operator. The advantage of this particular embodiment over the previous one is that the motion compensated lifting steps used to derive $\text{H-LL}_k^{d-1}$ and thence $\overline{\text{H-LL}_k^d}$ are able to exploit all of the motion information associated with the higher density mapping operator, $W_{i,j}^{d-1}$.

The ideas expressed above extend naturally to arbitrary temporal wavelet transforms with any number of lifting steps and any number of levels of temporal decomposition; such generalizations will be apparent to those skilled in the art. The nature of the final three dimensional transform is always such that the video frames may be recovered at any given video resolution, $\text{LL}_k^d$ using only the motion information corresponding to the operators, $\{W_{i,j}^D\}$ through $\{W_{i,j}^d\}$. This allows the total amount of motion information (e.g. the total number of block motion vectors, mesh node velocities, etc.) to scale with the resolution of interest within a final compressed data stream.

Although the above discussion is restricted to the context of a monochrome video source, this is only for simplicity of explanation. Generalization to multiple components, including those required for color video, should be apparent to those skilled in the art.

Lossless Compression

In an alternative embodiment of the invention, it is possible to incorporate lossless compression of the video signal to provide a scalable data stream which includes a lossless representation.

Lifting realizations of the wavelet transform may be applied in the domain of lossless compression. Any sequence of lifting steps may be reversed by virtue of the lifting structure, regardless of the particular operations which are applied to odd sub-sequence to generate update terms for the even sub-sequence or vice-versa.

The modern paradigm for wavelet-based lossless compression is to round the update terms to the nearest integer within each lifting step. This ensures that integer-valued input samples are always transformed to integer-valued subband samples. Moreover, subject to a suitable choice of wavelet transform, the integer sub-band samples have similar dynamic ranges to the original input samples, except that the high-pass sub-bands tend to have values which are typically very close to 0, leading to compression. This integer rounded version of lifting is described in the paper, R. Calderbank, I. Daubechies, W. Sweldens and B. Yeo, "Wavelet transforms that map integers to integers", *Applied and Computational Harmonic Analysis*, vol. 5, pp. 332-369, July 1998 (referenced above).

In the context of the present invention, effective lossless compression may be obtained merely by introducing the rounding steps after the motion compensation operators. This means, for example, that equations (1) and (2) become $$h_k[m,n] = x_{2k+1}[m,n] - \langle (W_{2k,2k+1}(x_{2k}))[m,n] \rangle \quad (1a)$$

and $$l_k[m,n] = x_{2k}[m,n] + \left\langle \frac{1}{2}(W_{2k+1,2k}(h_k))[m,n] \right\rangle \quad (2a)$$

where $\langle x \rangle$ means round x to the nearest integer. Of course, all spatial transforms must also be performed in reversible way, which may be accomplished by including integer rounding in their respective lifting realisations. Reversible spatial wavelet transforms for lossless compression of images are well known to those skilled in the art.

In the present invention, therefore, motion compensated update terms are additionally subjected to rounding, so that the scalable data stream includes a lossless representation of the video. Note that rounding does not have to be to the nearest "integer", but generally one may think of working in a number system where the original image samples (say eight bits deep originally) have six integer bits and two fraction bits: in this case, the rounding would map all lifting update steps to the nearest multiple of 0.25. "Rounding" in the context of the present invention means rounding with reference to the number system of the original image samples.

As well as developing a effective scalable video compression apparatus and method, as discussed above, the present applicants have also developed novel implementations for scalable video signals, particularly, but not exclusively, utilising the scalable video compression method discussed above.

A novel application of scalable video is in surveillance systems and also in the storage of sensitive video information.

Figure 5:
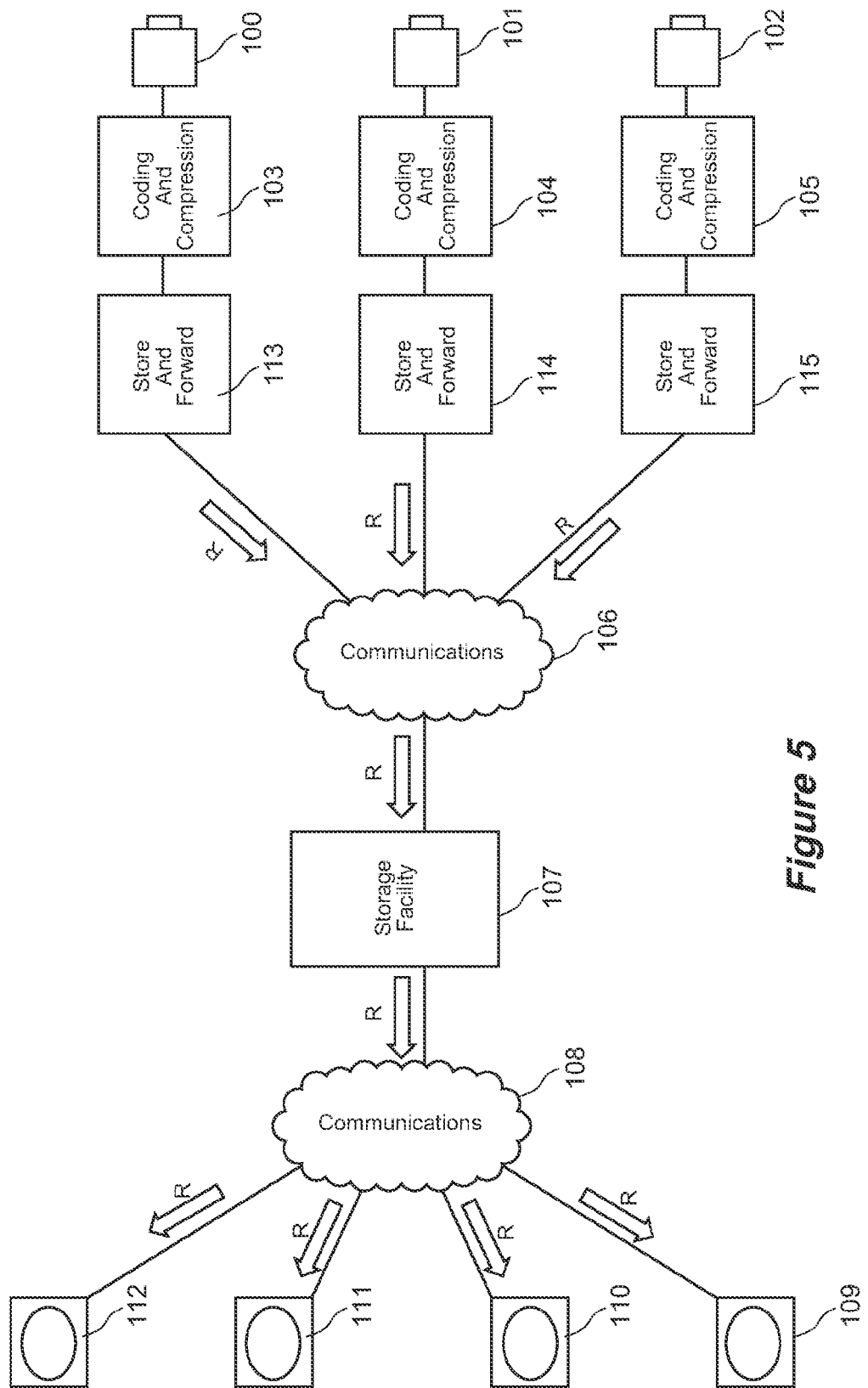
FIG. 5 is a schematic diagram of a surveillance system utilizing an embodiment of the present invention to provide scalable video signals.

FIG. 5 shows a schematic block diagram of a surveillance system utilizing a scalable video implementation in accordance with an embodiment of the present invention as described above.

The diagram shows surveillance cameras 100, 101, and 102, for detecting surveillance information and producing a surveillance video signal. The surveillance video signal is coded and compressed, in accordance with the scalable video coding method discussed above, by coding in compression apparatus 103, 104, 105. The scalable video signals are delivered via a communications medium 106 to a storage facility 107 for storing the compressed scalable video data. The storage facility on-forwards scalable video data via communications medium 108 to decompression and display units 109, 110, 111 and 112.

It will appreciated that the number of video cameras and video display units need not be limited to the amount shown in the drawings. The items shown in the drawings are representative only.

The communications media 106 and 108 may be any communications media eg. Internet, telephone lines, radio waves etc.

Because these communications channels may have uncertain bandwidth and because the volume of traffic may also be unpredictable, a store and forward system 113, 114, 115 is provided for each camera 100, 101, 102, and is able to store data and offload compressed data at a later time when less data is being generated or when the network capacity is increased.

In accordance with an embodiment of the present invention, the scalability of the video signal may be employed to allow a sub-set of the compressed data stream to be streamed in real-time to the storage facility 107, subjecting the remaining portions to the store and forward solution. Since the data is scalable, the quality of the representation available at the storage facility will be high as possible (given the available conditions) at any given time. By contrast, with a non scalable video compression solution, entire video frames might need to be handed off to the store and forward solution. These might contain critical information which could be lost in the event that the store and forward solution failed for some reason (eg. terrorist activity, local disk failure, etc). In the diagram, streaming of the sub-set of the compressed data stream is indicated by the arrow labeled "R".

Note that this advantageous development is not limited to surveillance applications, but could be used in other applications in which sensitive information is produced and requires reliable storage.

Further, for surveillance applications in particular (but not limited to these), the scalable video compression together with the interactive browsing paradigm described above in relation to FIG. 3, have significant application. The storage facility 107 (or where the storage facility does not exist, surveillance cameras 100, 101, 102) may act as a host for serving the scalable video content over networks with uncertain bandwidth (communications 108) to multiple potential monitors (109 to 112) or other devices, having different access capacities. The scalable content allows these remotely located monitors to access surveillance material at the highest quality consistent with their respective communications channels. As described above, the quality of received video will increase with the amount of time spent browsing any particular temporal and/or spatial regions of interest. Eventually, a completely lossless representation of the region of interest can be received (assuming that the lossless embodiment discussed above is applied).

Another novel application for scalable video is that of distributing the video to multiple destinations simultaneously, each of which may involve a different communication capacity (heterogeneous distribution channels). With a scalable data source, it is possible to avoid sending separate copies of the video, each at different compressed bit-rates, to meet the needs of the end users. Such an approach may not even be possible if the communication capacity at the source is limited. Instead, scalable data can be injected into the network at maximum quality and scaled back at selected nodes within the network in order to satisfy the various demands of the end users and their access bandwidths. These scaling activities could be viewed as part of a congestion management strategy implemented by intelligent network switches.

Figure 6:
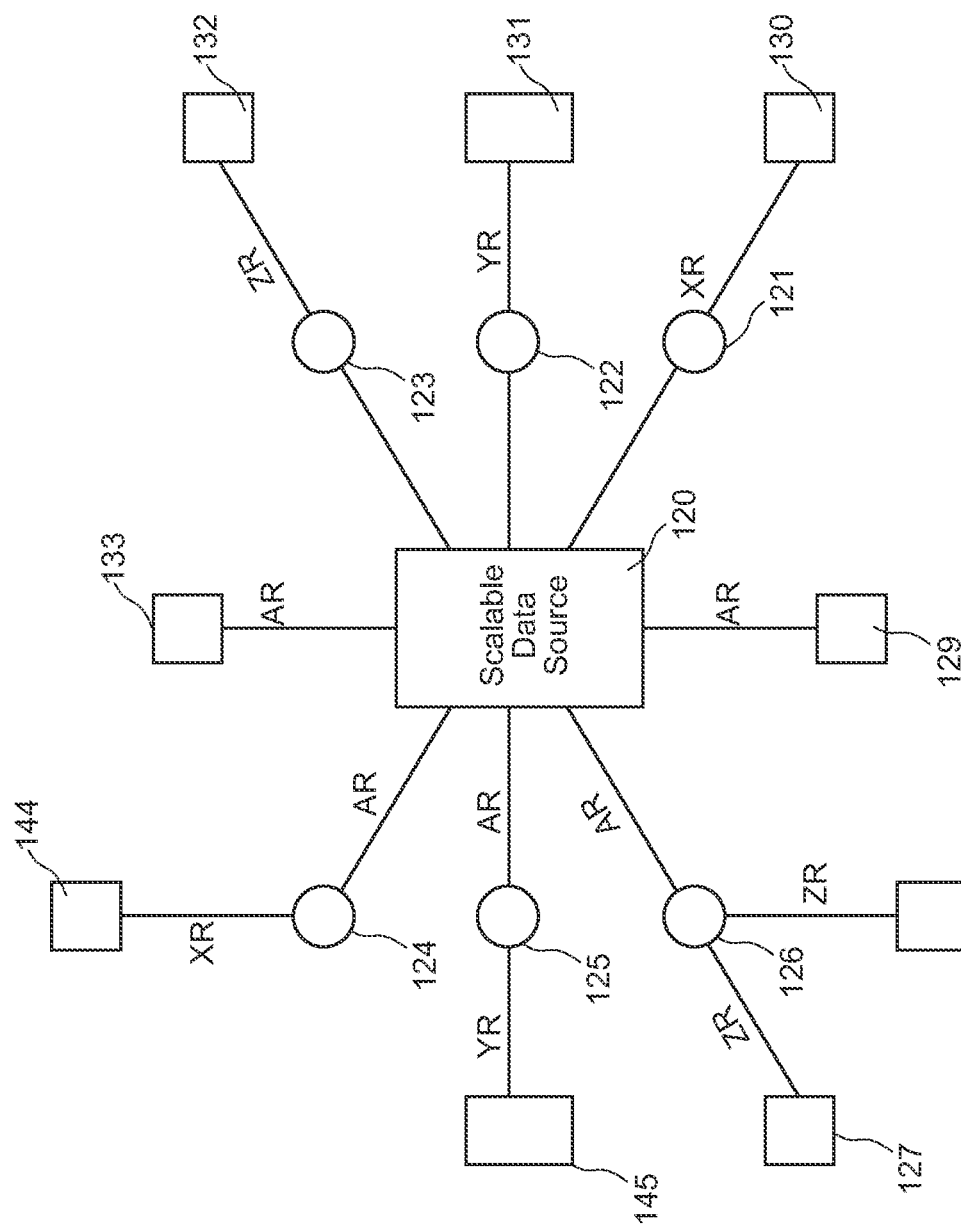
FIG. 6 is a schematic diagram of a heterogeneous distribution system utilizing an embodiment of the present invention for distribution of scalable video signals.

Such an embodiment is schematically illustrated in FIG. 6. The scalable data source 120 (which may be any type of data source which generates scalable video data, preferably in accordance with an embodiment of the present invention) serves data to a network including a plurality of nodes 121, 122, 123, 124, 125, 126. The compressed video may be served out at a rate AR to the nodes 121 to 126. The nodes then select a further rate eg. YR, ZR suitable for the subsequent communications channel for serving out the video to destination devices 127 to 145. Because the video is scalable, depending on time and the communications channel the destination devices may receive as much or little of the video content as they wish or are able.

It will be appreciated that the implementations of scalable video signals as discussed above are not limited to requiring the scalable data to be implemented in accordance with the embodiment of the invention described in relation to FIGS. 1 to 4. Any method for properly creating scalable video data may be utilized for novel applications discussed above, particularly in relation to FIG. 4 and FIG. 5. Implementation by way of the embodiments of FIGS. 1 to 4 is preferred, however.

Scalability, in particular, scalable data compressed in accordance with the present invention, may also be utilised for the unequal protection of compressed data in error-prone communication channels. These include wireless channels (possibly with deliberate interference, as in military applications) and also land-based networks subject to congestion. Since not all of the compressed data stream need arrive in order to reconstruct a useful rendition of the content, it is reasonable to assign different levels of protection to the different components (e.g. quality layers) of the compressed data stream. An unequal error protection may include the use of forward error correction codes or the assignment of different transmission power levels to different components of a wireless communication.

Another application of scalable video data, particularly (but not exclusively) scalable video data produced in accordance with the embodiment of the present invention discussed above, is in digital cinema. Video can be edited so that all copies can be kept losslessly, the copies can be accessible in a scalable fashion for editing purposes, for distribution purposes, etc. A "store and forward" concept can be used to distribute motion pictures which have been digitized and compressed, encrypted and delivered to theatres using either physical media distribution (such as DVD/ROMS) or through other electronic transmission means such as satellite.

Further, there is the potential for real-time streaming of video to cinemas, or of cinematic content to end users other then cinemas, possibly at a reduced quality.

Another application of the scalability paradigm is in telemedicine. For example, a senior surgeon could remotely monitor the procedures being carried out by a junior surgeon. If the senior surgeon wishes to focus on an aspect of the signal they could recover a higher quality bit stream over the lower quality bit stream that they are using to monitor the process.

Although the discussion above is concerned with the transformation and compression of motion picture information, it should be apparent that the invention is applicable to other applications in which sequences of images are to be compressed. Examples of particular interest include volumetric medical imagery and the images used by image-based three dimensional rendering applications.

It will be appreciated by a person skilled in the art that numerous variations and/or modifications may be made to the present invention as shown in the specific embodiment without departing from the spirit or scope of the invention as broadly described. The present embodiment is, therefore, to be considered in all respects to be illustrative and not restrictive.

The invention claimed is:

1. A method of providing for interactive remote browsing of compressed digital video signals, comprising the steps of:
    making available to a network, by way of a server computing system connected to the network, a scalable compressed signal representing a video sequence, the scalable compressed signal having been generated by forming a video sequence into an input signal, decomposing the input signal into a set of temporal frequency bands in a manner which exploits motion redundancy, partitioning the frequency band coefficients into blocks with defined extent in space and time, and applying scalable coding methods to the blocks of frequency band coefficients so as to generate a scalable compressed video signal with the attributes of resolution scalability, region of interest accessibility, and quality scalability of the coefficient blocks;
    selecting, by way of a client computing system connected to the network, a portion of the scalable compressed signal for decompression and viewing as a video sequence;
    providing the selected portion of the signal on the network by the server to the client;
    monitoring the choice of selection by the client;
    monitoring the status of a video cache on the client computing system so that the server computing system knows what portion of the signal the client has already received and can determine what further portion of the scalable signal is required in response to the choice of selection by the client;

selecting, by way of the client, a further portion of scalable compressed signal of interest to the client; and providing the selected further portion of the signal on the network by the server to the client.

2. A method in accordance with claim 1, including the further step of monitoring the selection of the portion of the signal by the client-using the server, whereby when the client selects a further portion of signal in a particular region of interest, the server is able to provide the selected further portion of signal to the client.

3. A method in accordance with claim 1, wherein the signal is scalable in a plurality of dimensions, and the method includes the further step of the server, in response to the client selecting a portion relating to the dimension of the region of interest, providing the portion relating to the dimension of the region of interest.

4. A method in accordance with claim 3, wherein the frequency bands have been generated by decomposing the input signal using both temporal and special frequency transformation so that the compressed video signal has the attributes of spatial resolution scalability as well as temporal resolution scalability in addition to the attributes of region of interest accessibility and quality scalability.

5. A method in accordance with claim 1, comprising the further step of caching received portions of the scalable compressed signal using the client, whereby the further portions of the scalable compressed signal may be added to the cached portions for decompression to produce video in the region of interest.

6. A method in accordance with claim 5, wherein the server computing system keeps track of the data which has been cached by the client computing system and transmits only data which has not been cached to the client computing system.

7. A method in accordance with claim 1, wherein the step of decomposing the input signal comprises the further step of further decomposing the temporal frequency bands into spatial frequency bands, to result in spatio-temporal frequency bands.

8. A method in accordance with claim 1, wherein the step of decomposing the input signal into a set of temporal frequency bands includes the steps of separating the input signal into even and odd index frames sub-sequences, and applying a sequence of motion compensated lifting operations each of which either adjusts the odd frames sub-sequence by the addition of a linear combination of motion compensated frames from the even frames sub-sequence incorporating motion compensation or adjusts the even frame sub-sequence by the addition of a linear combination of motion compensated frames from the odd frames sub-sequence.

9. A method in accordance with claim 1, wherein the scalable coding method supplied to the decomposed input signal includes spatial sub-band transformation of temporal sub-bands and coding of embodied code blocks from the resulting spatio temporal sub-band.

10. A method in accordance with claim 9 comprising selecting, by way of the server computing system, portions of embodied code-blocks for delivery to the client computing system based on the status of the client video cache and knowledge of the portion of scalable compressed signal of interest selected by the client.

11. A system for providing for interactive remote browsing of compressed digital video signals, comprising:

a server computing system arranged to be connected to a network and comprising a processor and a memory for storing a scalable compressed signal representing a video sequence, the scalable compressed signal being generated by forming a video sequence into an input signal, decomposing the input signal into a set of temporal frequency bands in a manner which exploits motion redundancy, partitioning the frequency band coefficients into blocks with defined extent in space and time, and applying scalable coding methods to the blocks of frequency band coefficients so as to generate a scalable compressed video signal with the attributes of resolution scalability, region of interest accessibility, and quality scalability of the coefficient blocks;

the server computing system being arranged to provide a selected portion of the signal on the network to a client computing system which is connected to the network and arranged to select the portion of the scalable compressed signal for decompression and viewing as a video sequence;

the server computing system being arranged to monitor the choice of selection by the client and determine when the client makes a selection of further portions of the scalable compressed signal;

the server being arranged to monitor the status of a video cache on the client computing system so that the server computing system knows what portion of the signal the client has already received and is arranged to determine what further portion of the scalable signal is required in response to the choice of selection by the client; and the server system being arranged to provide the selected further portion of the signal on the network to the client.

12. A system in accordance with claim 11, wherein the input signal is decomposed by further decomposing the temporal frequency bands into spatial frequency bands, to result in spatio-temporal frequency bands.

13. A system in accordance with claim 12, wherein the input signal is decomposed into a set of temporal frequency bands by separating the input signal into even and odd indexed frames sub-sequences, and applying a sequence of motion compensated lifting operations to alternately update the odd frame sub-sequence based upon the even frame sub-sequence and vice-versa in a manner which is sensitive to motion.

14. A system in accordance with claim 11, wherein the scalable coding methods applied to the decomposed input signal includes spatial sub-band transformation of temporal sub-bands and coding of embodied code-blocks from the resulting spatio-temporal sub-bands.

15. A system in accordance with claim 14, wherein the server computing system is arranged to select portions of embodied code-blocks for delivery to the client computing system based on the status of the client video cache and knowledge of the portion of scalable compressed signal of interest selected by the client.

16. A client computing system for use with the system of claim 11, and including selection means for selecting a portion of the scalable compressed signal, a decompressor for decompressing the scalable signal for viewing as a video sequence, the selection means being arranged to select further portions of the scalable signal relating to a region of interest of the client.

17. A system, comprising a client computer in accordance with claim 16 and a system in accordance with claim 11.

* * * * *